(12) United States Patent  
Stewart et al.

(10) Patent No.: US 10,608,920 B2
(45) Date of Patent: Mar. 31, 2020

(54) PERFORMANCE TESTING AUDIO/VIDEO COMMUNICATIONS IN NETWORK

(71) Applicant: MARTELLO TECHNOLOGIES CORPORATION, Ottawa (CA)

(72) Inventors: Geoff Stewart, Ottawa (CA); Douglas Bellinger, Ottawa (CA)

(73) Assignee: MARTELLO TECHNOLOGIES CORPORATION, Ottawa (CA)

( * ) Notice: Subject to any disclaimer, the term of this patent is extended or adjusted under 35 U.S.C. 154(b) by 0 days.

(21) Appl. No.: 15/864,788

(22) Filed: Jan. 8, 2018

(65) Prior Publication Data

US 2018/0198699 A1    Jul. 12, 2018

Related U.S. Application Data

(60) Provisional application No. 62/443,310, filed on Jan. 6, 2017.

(51) Int. Cl.
*G06F 15/173* (2006.01)
*H04L 12/26* (2006.01)
(Continued)

(52) U.S. Cl.
CPC .......... *H04L 43/50* (2013.01); *H04L 41/0253* (2013.01); *H04L 43/08* (2013.01);
(Continued)

(58) Field of Classification Search
CPC ..... H04L 43/50; H04L 42/0253; H04L 43/08; H04L 45/608; H04L 67/025; H04M 3/28
See application file for complete search history.

(56) References Cited

U.S. PATENT DOCUMENTS 4,567,591 A * 1/1986 Gray ..................... H03M 13/05
370/326
5,880,723 A * 3/1999 Driskell ............... G06F 3/04842
715/866

(Continued)

OTHER PUBLICATIONS

Levent-Levi, T., "Node.js and WebRTC go Together Like Peanut Butter and Chocolate," Mar. 27, 2013, BlogGeek.me.

(Continued)

*Primary Examiner* — Thanh T Nguyen
(74) *Attorney, Agent, or Firm* — Perry + Currier Inc.

(57) ABSTRACT

A test webpage triggers a remote computer to obtain a token for the performance test from a test data collection server. The test webpage triggers the remote computer to transmit the token to a reflector server to initiate the performance test. The reflector server initiates the performance test upon validating the token. The reflector server performs bidirectional communication of test data over a Web Real-Time Communication (WebRTC) data channel using a loss tolerant protocol with the remote computer. The remote computer is able to determine computer-endpoint test results from the bidirectional communication of test data. The reflector server determines server-endpoint test results from the bidirectional communication of test data. The reflector server transmits the server-endpoint test results to the remote computer. The test webpage triggers the remote computer to transmit the computer-endpoint and the server-endpoint test results to the test data collection server.

22 Claims, 2 Drawing Sheets

(51) Int. Cl.
*H04L 29/06* (2006.01)
*H04L 29/08* (2006.01)
*H04L 12/24* (2006.01)
*H04M 3/28* (2006.01)
*H04M 7/00* (2006.01)

(52) U.S. Cl.
CPC .......... *H04L 65/608* (2013.01); *H04L 67/025* (2013.01); *H04M 3/28* (2013.01); *H04L 67/146* (2013.01); *H04L 69/16* (2013.01); *H04M 7/006* (2013.01)

(56) References Cited

U.S. PATENT DOCUMENTS

| | | | |
|---|---|---|---|
| 6,195,680 B1 * | 2/2001 | Goldszmidt | H04L 12/56 709/203 |
| 7,043,460 B2 | 5/2006 | Deboer et al. | |
| 7,216,168 B2 | 5/2007 | Merriam | |
| 7,957,304 B2 | 6/2011 | Kalbag | |
| 7,995,557 B2 | 8/2011 | Li et al. | |
| 8,254,268 B2 | 8/2012 | Qiu et al. | |
| 8,477,509 B2 * | 7/2013 | Snider | H04B 1/082 312/257.1 |
| 8,734,317 B2 * | 5/2014 | Sperling | A61M 21/00 434/236 |
| 8,918,497 B2 | 12/2014 | Nassar et al. | |
| 8,984,128 B2 | 3/2015 | Tuovinen et al. | |
| 9,118,599 B2 | 8/2015 | Jones | |
| 9,121,379 B2 * | 9/2015 | Saito | F02M 61/1806 |
| 9,294,538 B1 | 3/2016 | Rana et al. | |
| 9,363,334 B2 | 6/2016 | Bar-Zeev et al. | |
| 9,369,491 B2 | 6/2016 | Reddy et al. | |
| 2014/0108583 A1 * | 4/2014 | Kulkarni | H04L 51/046 709/206 |
| 2015/0346987 A1 * | 12/2015 | Ren | G06F 1/32 345/589 |
| 2016/0191351 A1 | 6/2016 | Smith et al. | |
| 2016/0212073 A1 * | 7/2016 | Kulkarni | H04L 51/046 |
| 2017/0220459 A1 * | 8/2017 | Kulkarni | G06F 11/3688 |
| 2017/0264575 A1 * | 9/2017 | Willshire | H04L 41/5038 |
| 2018/0034753 A1 * | 2/2018 | Willshire | H04L 41/5038 |
| 2018/0198699 A1 * | 7/2018 | Stewart | H04L 41/0253 |
| 2019/0274062 A1 * | 9/2019 | Ma | H04W 28/0268 |

OTHER PUBLICATIONS

"Testing—TestRTC." TestRTC, testrtc.com/testing/. Retrieved from the Internet on Nov. 18, 2016.

"netscan," Netscan, https://www.netscan.co/?cc. 2016. Retrieved from the Internet on Nov. 18, 2016.

Google LLC, Web App: WebRTC Troubleshooter. Retrieved from the Internet on Nov. 18, 2016 from URL.

* cited by examiner

PERFORMANCE TESTING AUDIO/VIDEO COMMUNICATIONS IN NETWORK

CROSS-REFERENCE TO RELATED APPLICATIONS

This application claims the benefit of U.S. provisional patent application Ser. No. 62/443,310, filed Jan. 6, 2017, which is incorporated herein by reference.

FIELD OF THE INVENTION

The present invention relates to computer networks, and in particular video and audio (e.g., voice) communications in networks.

BACKGROUND

Communications services, such as Voice over Internet Protocol (VoIP) telephony, video conferencing/chat, and unified communications systems often perform poorly due to various problems with the underlying computer network that carries the communications traffic.

In some scenarios, an organization obtains VoIP telephony equipment, or subscribes to a cloud-based service, and purchases phones and installs same in its existing network only to find that call quality is poor, despite having obtained a positive indicator from one of the well know connection speed test sites/utilities. This creates a negative first impression of VoIP services and requires unexpected testing of and improvement to the network, if the organization even decides to keep using the VoIP service.

In other scenarios, an organization that already uses VoIP telephony service begins to notice quality degradation, perhaps due to changes in the network made for other reasons. The organization must then spend considerable resources to test and upgrade the network to return the service quality to its previous level. This can be the case even when a conventional speed test site/utility suggest that the network is performing well.

The same scenarios apply to video conferencing/chat services, unified communications systems, and other audio and video services.

Testing a network to assess quality issues affecting audio and/or video performance is not trivial. Well-known network speed/bandwidth test schemes tend to test generalized data throughput over protocols designed for lossless data communications. These testing schemes are inappropriate for evaluating audio and/or video performance. For instance, it is common for one of these testing schemes to report high network capacity for a network that has poor actual audio and/or video performance.

The failure of known testing schemes to properly account for audio and video hinders the adoption of VoIP telephony, video conferencing/chat services, unified communications systems, and similar, and further makes it difficult to improve the quality of such services where they are already used. As such, improved audio and/or video performance testing is needed.

DETAILED DESCRIPTION

The present invention aims to solve at least one of the problems discussed above. The present invention implements an audio and/or video performance test using techniques that improve the accuracy of the test results. Accordingly, an organization contemplating installing an audio and/or video service can discover in advance any potential problems with the network, can be recommended suitable equipment for the service, and can be given a realistic expectation of the quality of the service prior to installation. That is, the present invention allows for accurate site qualification, which leads to a better first impression of the service. In addition, the present invention can be used to test existing audio and/or video services in a network to facilitate improvements to the network.

According to the invention, an audio and/or video performance test uses Web Real-Time Communication (WebRTC), and particularly, uses a WebRTC data channel using UDP to simulate a lossy audio/video communications session, so that the test can be readily performed between a remote computer's browser and a suitably configured server.

Figure 1:
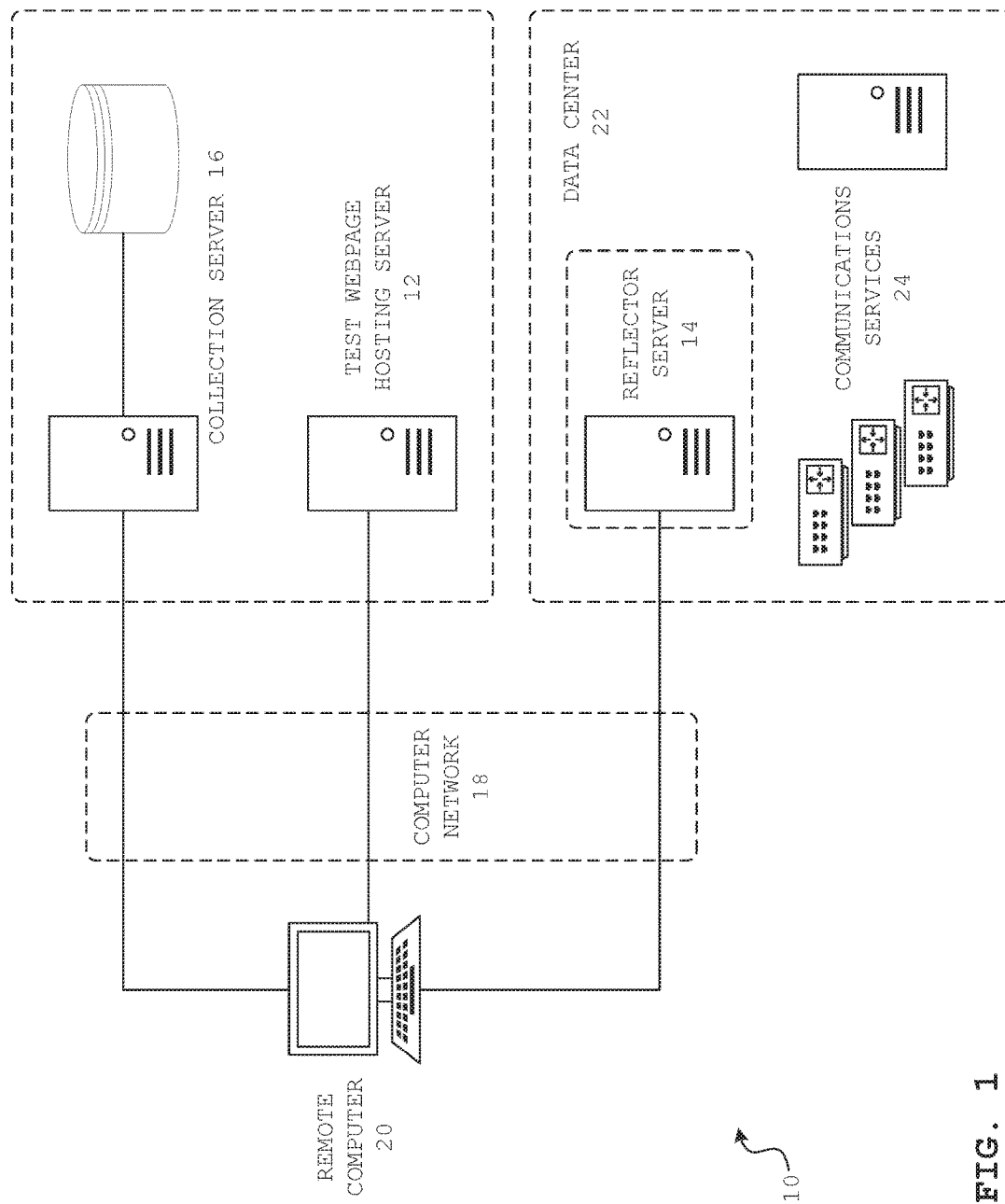
FIG. 1 is a diagram of a system for a performance test, according to the present invention.

FIG. 1 shows a system 10 for performing an audio and/or video performance test according to the present invention.

The system 10 includes a test webpage hosting server 12, a reflector server 14, and a test data collection server 16 connected to a computer network 18. Multiples of each of these servers can be provided and the term "server" is used herein to mean one or more servers. One or more remote computers 20 connect to the computer network 18 to communicate with the servers 12, 14, 16. The remote computers 20 are situated within organizations (corporations, schools, government offices, etc.) where new audio and/or video services are to be installed or existing audio and/or video services are to be tested. Audio/video services may be installed at the organization's network or may be provided outside the organization's network (e.g., third-party cloud-based or hosted services).

As will be described below, a remote computer 20, such as a notebook computer, desktop computer, smartphone/tablet, or similar device, can initiate, participate in, and report results for an audio and/or video performance test. This is advantageously done without the need for special software to be installed at the remote computer 20. A web browser (user agent) is all that is required. In addition, permission to access a microphone or camera of the remote computer 20 is not needed. This simplifies the test for the user and helps protect their privacy.

It should be noted that a remote computer 20 participating in a test may be one of the actual endpoints (devices) for which audio and/or video service is to be installed or tested. That is, the remote computer 20 may include audio and/or video equipment (e.g., microphone, speaker, headset, camera, etc.) for use in actual VoIP, video, or unified communications. Alternatively or additionally, a remote computer 20 may be a surrogate for another endpoint, such as a VoIP telephone or video conference device, for which audio and/or video service is to be installed or tested. For example, the remote computer 20 can be used as a stand-in for another device prior to deploying a service. In addition, the remote computer 20 can be used to simulate multiple endpoints, so that a comprehensive test for a network site can be performed without the need to use multiple devices. In this way, site qualification, or site maintenance in the case of existing service, for a wide variety of scenarios can be performed for the location of the remote computer 20.

The computer network 18 represents one or more computer networks that provide communications pathways between the remote computer 20 and each of the test webpage hosting server 12, the reflector server 14, and the test data collection server 16. The computer network 18 can include a local network that contains the remote computer 20, the internet a network local to each of the servers 12, 14, 16, and similar. Computers/servers may be located in the same network. For example, if audio and/or video communications equipment is (or is planned to be) installed in the same local network as the remote computer 20, then the reflector server 14 can be located in the same local network. The local network pathway between the remote computer 20 and the reflector server 14 is thus what is tested. In another example, audio and/or video communications equipment is provided by a third-party cloud-based service. The network pathway between the remote computer 20 and the a reflector server 14 at the third-party location is what is tested. Numerous network topologies are possible and these will not be exhaustively listed here.

As an overview of the server functionality, the reflector server 14 executes the audio and/or video performance test with the remote computer 20 upon the remote computer 20 presenting a valid token, the test data collection server 16 stores test results from completed tests and assigns tokens for new tests, and the test webpage hosting server 12 hosts and distributes a test webpage, also termed a web app, that defines the test and triggers the remote computer 20 to perform the test and undergo communications with the servers. The audio and/or video performance test is advantageously defined by the test webpage in a manner that allows the test to be retrieved and executed by any suitable user agent (web browser) on any remote computer 20. Suitable user agents include modern web browsers, such as Mozilla Firefox, Google Chrome, and others that implement at least the features of WebRTC discussed herein.

The reflector server 14 is located in the computer network 18 at or near the location of the audio and/or video communications equipment for which the test is to be conducted. Such audio and/or video communications equipment can include one or more servers, private branch exchanges (PBXs), adaptors, routers, switches, gateways, session border controllers, relays, and the like. The location of the reflector server 14 near the equipment allows for testing of the actual network pathway to the remote computer 20. In the example illustrated in FIG. 1, the audio and/or video communications equipment is located at a data center 22 that provides communications services 24, such as, for example, a virtual telephony services platform (e.g., Mitel® MiVoice Border Gateway or MBG), a unified communications platform (e.g., Mitel® Communications Director or MCD), and similar.

The reflector server 14 is configured to execute an audio and/or video performance test with a remote computer 20. To achieve this, in some examples, the reflector server 14 reflects inbound data packets received from the remote computer 20 back to the remote computer 20. The reflector server 14 and the remote computer 20 may also be configured to connect to each other using peer-to-peer techniques such as Session Traversal Utilities for Network Address Translator (STUN) and Interactive Connectivity Establishment (ICE), particularly when the reflector server 14 is outside the remote computer's network.

The performance test includes the reflector server 14 and the remote computer 20 performing bidirectional communication of test data over a WebRTC data channel using an unreliable, connectionless, loss tolerant protocol, such as user datagram protocol (UDP). Use of the WebRTC data channel allows for full control of the quantity and rate of test data packets, so that any type and number of voice and/or video communications, concurrent or otherwise, can be simulated without the need for the user at the remote computer 20 to authorize access to the computer's microphone, camera, or similar device. That is, the pattern of test data packets can be controlled to simulate various communications scenarios. The content of test data packets can be selected to contain simulated voice/video data, metadata concerning the test (e.g., information concerning the pattern), test results, instructions concerning the test, or a combination of such. It is contemplated that in many scenarios the content of test data packets will not affect the test results, and so the packets can be used to communicate metadata and test results between the remote computer 20 and the reflector server 14. Use of UDP allows for accurate measurement of actual packet loss and other real-world network conditions experienced during actual voice and/or video communications, as UDP better simulates actual audio/video protocols over IP than does Transmission Control Protocol (TCP), used by Websockets.

The reflector server 14 is configured to measure test results from its perspective, termed server-endpoint test results, based on the bidirectional communication of test data. The reflector server 14 is further configured to transmit the server-endpoint test results to the remote computer 20 that initiated the test.

The reflector server 14 is configured to initiate a performance test upon validating a token received from a remote computer 20.

The test data collection server 16 is configured to provide tokens to remote computers 20 for initiating performance tests. The test data collection server 16 is further configured to receive test results from remote computers 20 and to store such test results for analysis. The results for a given test are based on measurements made by the reflector server 14 (server-endpoint test results) and measurements made by the remote computer 20 (computer-endpoint test results).

The test webpage hosting server 12 is configured to provide a test webpage to the remote computers 20 upon receiving requests from the remote computers 20. The test webpage is configured to trigger a particular remote computer 20 to obtain a token for the performance test from the test data collection server 16 and then to trigger the remote computer 20 to transmit the token to the reflector server 14 to initiate the performance test. After the test is complete, the test webpage triggers the remote computer 20 to transmit all results to the test data collection server 16. The test results include the computer-endpoint test results determined by the remote computer 20 itself as well as server-endpoint test results determined by the reflector server 14 and transmitted from the reflector server 14 to the remote computer 20.

The performance test itself includes both the remote computer 20 and the reflector server 14 measuring any of roundtrip time, packet loss, jitter, communications rate, and similar.

As can be seen from the above, a bidirectional audio/video performance test can be executed by a browser at a remote computer 20. No special software need be installed and no permissions need be given to access a computer's microphone, camera, etc. This achieves a test that is less complex than known tests, while allowing the test to simulate any type and number of communications sessions without needing access to devices that can raise privacy concerns.

Figure 2:
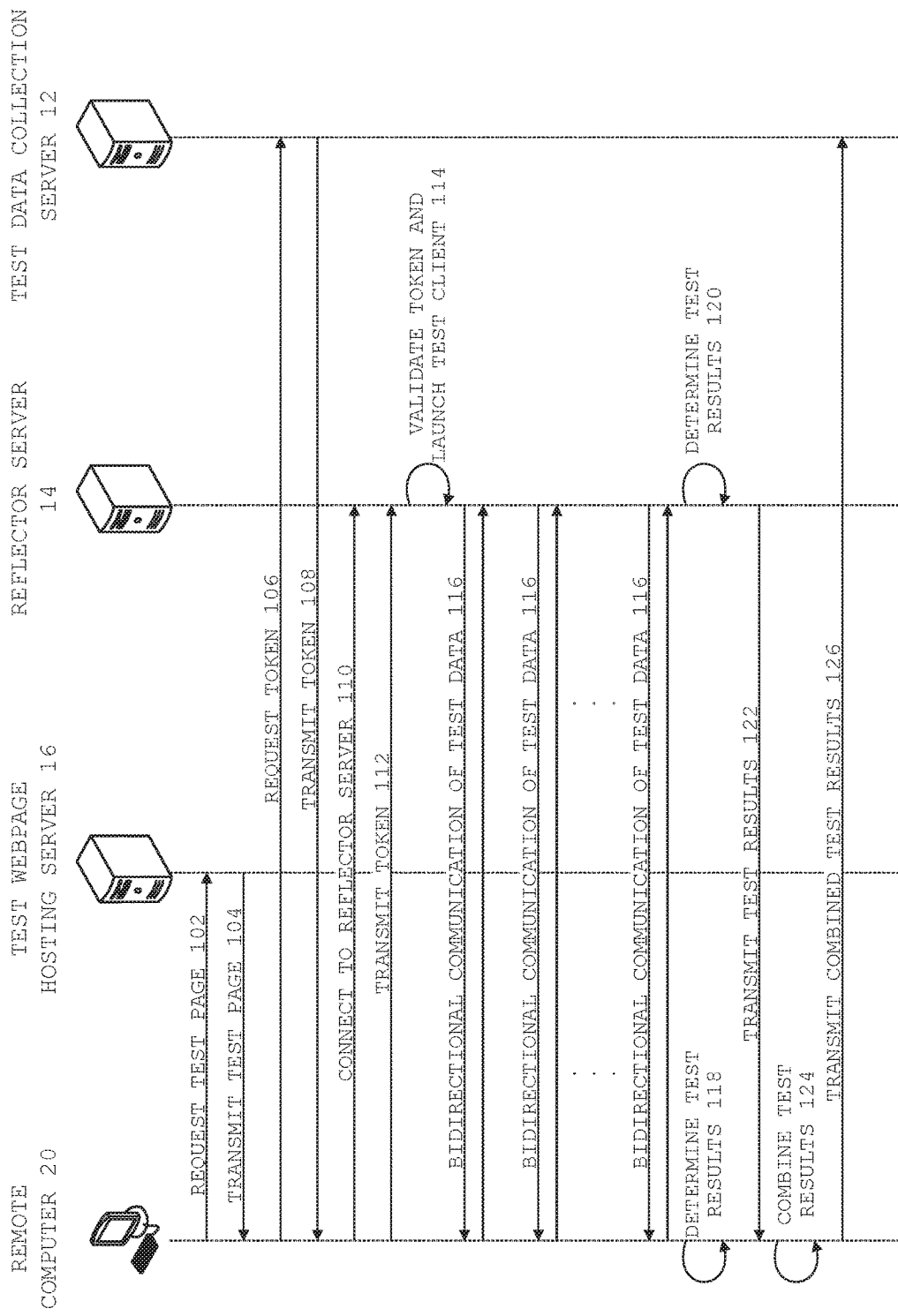
FIG. 2 is a diagram of a process for a performance test, according to the present invention.

FIG. 2 shows a process for performing an audio and/or video performance according to the present invention. The process will be described in the context of the system 10, but this is not to be taken as limiting and other systems can be used to implement the process. The communications described below are made through the computer network 18.

At steps 102, 104, a test webpage is transmitted from the test webpage hosting server 12 to a user agent at a remote computer 20 in response to a request generate by the remote computer 20. This can be achieved by, for example, the computer 20 being used to follow a hyperlink to the test webpage, enter a URL of the test webpage, or similar.

At steps 106, 108, the test webpage triggers the remote computer 20 to obtain a token for the performance test from the test data collection server 16. This can be triggered by the user clicking/tapping a button on the test webpage. The test data collection server 16 can assign tokens according to any suitable methodology. The test data collection server 16 can use each token to associate a remote computer 20 with a particular test and further associate subsequently provided test results with the particular test.

Then, at step 110, the test webpage triggers the remote computer 20 to make a TCP connection to the reflector server 14 using, for example WebSockets. Subsequently, at step 112, the remote computer 20 transmits the token to the reflector server 14 to initiate the performance test.

The reflector server 14 then, at step 114, validates the token. Validation of the token can be performed by any suitable methodology. For instance, the token generator (collection server 16) and token validator (reflector server 14) may both store the same shared secret that is used to generate and validate a token. Hashing, symmetric cryptography, asymmetric cryptography, and similar techniques may be used. Upon validating the token, the reflector server 14 initiates the performance test. In this example, test initiation includes the reflector server 14 generating a WebRTC client for the bidirectional communication of test data with the remote computer 20. A WebRTC peer connection is established between the client at the reflector server 14 and a WebRTC client that has been launched at the remote computer 20. A WebRTC data channel is then established between the clients. Messaging between the WebRTC clients at the remote computer 20 and the reflector server 14 is performed over the Web Socket connection. An ICE negotiation between the remote computer 20 and the reflector server 14 can be performed to help establish the data channel. Node.js can be used to implement the WebRTC functionality.

Next, at steps 116, the performance test is executed. This includes the WebRTC clients at the remote computer 20 and the reflector server 14 performing bidirectional communication of test data over the WebRTC data channel using UDP. The test can be triggered by a command issued by the remote computer 20 to the reflector server 14 over the Web Socket connection. Any suitable type and quantity of test data packet patterns may be used. Test packet patterns may be configured to simulate real-world VoIP calls, video communications sessions, unified communications, and the like.

The test data is communicated in UDP packets in a manner that simulates any type and number of VoIP and/or video communications sessions, concurrent or otherwise. In many contemplated scenarios, the test data does not contain actual audio or video data. Test packet content can be selected to facilitate various measurements. Notably, the process lacks any step of requesting or granting permission to access a microphone, camera, or similar device of the remote computer.

At step 118, the remote computer 20 determines test results from the bidirectional communication of test data by measuring any of roundtrip time, packet loss, jitter, communications rate, and similar. This may be performed as the test is underway or at the end of the test. These computer-endpoint test results are from the perspective of the remote computer 20.

At step 120, the reflector server 14 determines test results from the bidirectional communication of test data by measuring any of roundtrip time, packet loss, jitter, communications rate, and similar. This may be performed as the test is underway or at the end of the test. These server-endpoint test results are from the perspective of the WebRTC client at the reflector server 14 and are contemplated to be potentially different from the computer-endpoint test results. That is, one endpoint may experience more jitter, etc., than the other.

Next, at step 122, the reflector server 14 transmits its test results to the remote computer 20 in response to a request from the remote computer 20, which combines the server-endpoint test results with its own computer-endpoint test results, at step 124.

Lastly, at step 126, the test webpage triggers the remote computer 20 to transmit the combined computer-endpoint and server-endpoint test results to the test data collection server 16 for analysis, reporting, long-term storage, and similar operations. The test data collection server 16 or the remote computer 20 may further display the combined test results to the user at the remote computer 20. Alternatively or additionally, the combined test results are reported by a separate process to the organization operating the remote computer 20.

Numerous improvements and advantages of the present invention should be apparent from the above. Many conventional types of network speed tests attempt to saturate the network. In contrast, the present invention allows for scalable traffic based on a number of actual or planned endpoints (or other configurable load). This is a less invasive test, as the network can keep operating normally, and is less likely to trigger network problems. The WebRTC media channel is not used. Rather, the data channel is used. This allows the simulation of various scenarios and protects user privacy. UDP traffic over a WebRTC data channel simulates actual voice/video, rather than requiring the media channel and access to a user's microphone, camera, etc. Moreover, no special software at the remote computer is needed and only a web browser is required.

While the foregoing provides certain non-limiting examples, it should be understood that combinations, subsets, and variations of the foregoing are contemplated. The monopoly sought is defined by the claims.

What is claimed is:

1. A process for performing an audio and/or video performance test via a computer network, the process comprising:

transmitting, via the computer network, a test webpage from a test webpage hosting server to a user agent at a remote computer;

the test webpage triggering the remote computer to initiate the performance test with a reflector server;

the reflector server initiating the performance test;

executing the performance test, including the reflector server performing bidirectional communication of test data over a Web Real-Time Communication (WebRTC) data channel using a loss tolerant protocol with the remote computer, wherein the remote computer is able to determine computer-endpoint test results from the bidirectional communication of test data;

the reflector server determining server-endpoint test results from the bidirectional communication of test data;

the reflector server transmitting the server-endpoint test results to the remote computer; and the test webpage triggering the remote computer to transmit the computer-endpoint and the server-endpoint test results to a test data collection server.

2. The process of claim 1, wherein the reflector server generates a WebRTC client for the bidirectional communication of test data with the remote computer.

3. The process of claim 1, further comprising the remote computer making a Transmission Control Protocol (TCP) connection to the reflector server prior to performing bidirectional communication of test data over the WebRTC data channel.

4. The process of claim 1, wherein the reflector server is located in the computer network at a location of audio and/or video communications equipment.

5. The process of claim 1, further comprising the remote computer determining the computer-endpoint test results including measuring one or more of: roundtrip time, packet loss, jitter, and communications rate.

6. The process of claim 1, wherein the reflector server determining the server-endpoint test results comprises measuring one or more of: roundtrip time, packet loss, jitter, and communications rate.

7. The process of claim 1, wherein the loss tolerant protocol is a user datagram protocol (UDP).

8. The process of claim 1, wherein the test data does not contain actual audio or video data.

9. The process of claim 8, wherein the bidirectional communication of test data is performed without use of a microphone or camera at the remote computer.

10. The process of claim 8, wherein the test data is configured to simulate actual voice and/or video of a Voice over Internet Protocol (VoIP) or video communications session.

11. The process of claim 10, wherein the test data is configured to simulate a selected number of more than one concurrent VoIP and/or video communications sessions.

12. A system for performing an audio and/or video performance test over a computer network, the system comprising:

a reflector server configured to initiate the performance test as initiated by a remote computer, the performance test including the remote computer and the reflector server performing bidirectional communication of test data over a web real-time communication (WebRTC) data channel using a loss tolerant protocol, the reflector server configured to determine server-endpoint test results from the bidirectional communication of test data and transmit the server-endpoint test results to the remote computer; and a test webpage hosting server configured to provide a test webpage to remote computers including the remote computer, via the computer network, upon receiving requests from the remote computers, the test webpage configured to initiate the performance test with the reflector server, the test webpage further configured to trigger the remote computer to transmit the server-endpoint test results and computer-endpoint test results determined by the remote computer to a test data collection server.

13. The system of claim 12, wherein the reflector server is configured to generate a WebRTC client for the bidirectional communication of test data with the remote computer.

14. The system of claim 12, wherein the reflector server is configured to establish a Transmission Control Protocol (TCP) connection with the remote computer prior to performing bidirectional communication of test data over the WebRTC data channel.

15. The system of claim 12, wherein the reflector server is located in the computer network at a location of audio and/or video communications equipment.

16. The system of claim 12, wherein the remote computer is configured to determine the computer-endpoint test results by measuring one or more of: roundtrip time, packet loss, jitter, and communications rate.

17. The system of claim 12, wherein the reflector server is configured to determine the server-endpoint test results by measuring one or more of: roundtrip time, packet loss, jitter, and communications rate.

18. The system of claim 12, wherein the loss tolerant protocol is a user datagram protocol (UDP).

19. The system of claim 12, wherein the test data does not contain actual audio or video data.

20. The system of claim 12, wherein the test data is configured to simulate a selected number of more than one concurrent VoIP and/or video communications sessions.

21. The process of claim 1, further comprising:

the test webpage triggering the remote computer to obtain, via the computer network, a token for the performance test from the test data collection server;

the test webpage triggering the remote computer to transmit the token, via the computer network, to a reflector server to initiate the performance test with the reflector server; and the reflector server initiating the performance test upon validating the token.

22. The system of claim 12, further comprising:

the test data collection server, the test data collection server being configured to provide tokens to remote computers;

wherein the reflector server is configured to initiate the performance test upon validating a token received from the remote computer;

wherein the test webpage is configured to trigger the remote computer to obtain, via the computer network, a token for the performance test from the test data collection server, the test webpage further configured to trigger the remote computer to transmit the token, via the computer network to the reflector server to initiate the performance test.

* * * * *